United States Patent [19]

Yokoyama

[11] Patent Number: 5,043,818
[45] Date of Patent: Aug. 27, 1991

[54] IMAGING PERIOD CONTROLLABLE SOLID-STAGE IMAGE PICKUP DEVICE COMPRISING A DRAIN SHIFT REGISTER

[75] Inventor: Toshimichi Yokoyama, Tokyo, Japan

[73] Assignee: NEC Corporation, Japan

[21] Appl. No.: 398,618

[22] Filed: Aug. 25, 1989

[30] Foreign Application Priority Data

Aug. 27, 1988 [JP] Japan ................................. 63-213023

[51] Int. Cl.⁵ ........................ H04N 3/14; H04N 5/335
[52] U.S. Cl. ......................... 358/213.19; 358/213.23;
358/213.29
[58] Field of Search ...................... 358/213.24, 213.23,
358/213.29, 213.19

[56] References Cited

U.S. PATENT DOCUMENTS

| | | | |
|---|---|---|---|
| 4,242,599 | 12/1980 | Suzuki | 358/213.19 |
| 4,447,735 | 5/1984 | Horii | 358/213.23 |
| 4,597,013 | 6/1986 | Matsumoto | 358/213.23 |
| 4,837,629 | 6/1989 | Shiromizu | 358/213.19 |

FOREIGN PATENT DOCUMENTS

163963 12/1980 Japan ............................. 358/213.24

Primary Examiner—James J. Groody
Assistant Examiner—Wendy R. Greening
Attorney, Agent, or Firm—Laff, Whitesel, Conte & Saret

[57] ABSTRACT

In a CCD solid-state image pickup device comprising a plurality of photosensitive elements arranged in a plurality of parallel columns, a vertical shift register adjacent to each column of the photosensitive elements, and a horizontal shift register coupled to the vertical shift register, a drain shift register is coupled to a drain circuit to drain disused charges accumulated in the photosensitive elements in each vertical blanking time period except for a specific time period of the vertical blanking time period. The drain shift register may be coupled to the photosensitive elements of each column through a plurality of drain transfer gates. Alternatively, the drain shift register may be coupled to the photosensitive elements through the vertical shift register. The drain shift register may be coupled to the drain circuit either directly or through the horizontal shift register.

18 Claims, 6 Drawing Sheets

IMAGING PERIOD CONTROLLABLE SOLID-STAGE IMAGE PICKUP DEVICE COMPRISING A DRAIN SHIFT REGISTER

BACKGROUND OF THE INVENTION

This invention relates to a solid-state image pickup device for use in picking up images. Such a solid-state image pickup device is particularly useful in a television camera.

A conventional solid-state image pickup device has a plurality of parallel columns of photosensitive elements on a semiconductor substrate for accumulating electric charges as sensed charges in response to incident light. A plurality of vertical shift registers are arranged along one side of each column. In order to transfer the accumulated charges to the adjacent vertical shift registers, a transfer gate is arranged between each of the columns of the photosensitive elements and the adjacent vertical shift registers. The transfer gate transfers the accumulated charges from the photosensitive elements to the adjacent vertical shift register in each vertical blanking time period. A horizontal shift register is coupled to one end of each vertical shift register. For one picture field, the horizontal shift register serially outputs the transferred charges as an image signal in each horizontal scanning time period. The picture field is for making a single image of an object. The above-described image pickup device is well known in the art as a CCD (Charge Coupled Device) solid-state image pickup device.

As known in the art, an accumulating time period for the photosensitive elements varies according to television standards. According to the NTSC system, wherein a television signal has sixty fields per second, the accumulating time period is equal to 1/60 second. Such an accumulating time period is much too long for the solid-state image pickup device and is not suitable for picking up the image of a moving object because the image becomes obscure. Furthermore, the long picking up time generates an overflow of sensed charges accumulated in the photosensing element to generate a blooming phenomenon.

In order to achieve a high speed sensing and to prevent the blooming phenomenon of sensed charges, electronic shutter operation is well known. The electronic shutter operation can be realized by a drain circuit or a charge drain region coupled to another end of each vertical shift register. The drain circuit or the like is for draining, as disused charges, the excessive charges accumulated in the photosensitive elements. With regard to the electronic shutter operation, the disused charges are transferred to the vertical shift registers at a beginning of the vertical blanking time period. The vertical shift registers shift the transferred disused charges to the drain circuit or the charge drain region in response to a drain shift pulse signal having a first clock rate. During shift operation of the transferred disused charges, the photosensitive elements afresh accumulate the electric charges. Subsequently, the accumulated charges are transferred again to the vertical shift register on completion of the electronic shutter operation. In response to a shift pulse signal having a second clock rate, the vertical shift registers shift the transferred charges to the horizontal shift register. The first clock rate for transferring the disused charges must be higher than the second clock rate for transferring the signal charges for the following reason.

A time interval between completion of transfer of the disused charges and beginning of transfer of the accumulated charges is called an electronic shutter time period. For example, the electronic shutter time period is equal to 1/1000 second. The disused charges must be shifted to the drain circuit or the like within the electronic shutter time period.

As will later be described in detail, the vertical shift register can shift a restricted quantity of the transferred disused charges in quantity. This means that when a large quantity of charges are introduced into the vertical shift register, the charges overflow from a stage in the vertical shift register to other stage thereof to cause a blooming phenomenon. To prevent such charge overflow, the excessive electric charges accumulated in photosensitive elements are drained by the electronic shutter operation. In the conventional solid-state image pickup device, however, it is hard to effectively utilize the electronic shutter operation.

SUMMARY OF THE INVENTION

It is therefore an object of this invention to provide a solid-state image pickup device which is capable of obtaining a clear image.

It is another object of this invention to provide a solid-state image pickup device which can effectively utilize electronic shutter operation.

A solid-state image pickup device to which this invention is applicable comprises a plurality of photosensitive elements arranged in a plurality of columns for accumulating electric charges in response to incident light as accumulated charges. Each of the columns has first and second sides. The device further comprises a vertical shift register adjacent to the first side of each column. The vertical shift register has first and second ends. The device still further comprises transfer gate means for transferring, as transferred charges, the accumulated charges to the vertical shift register. The device yet further comprises a horizontal shift register coupled to the first end of each vertical shift register for serially shifting the transferred charges.

According to an aspect of this invention, the device comprises a drain shift register adjacent to the second side of each column of the photosensitive elements and drain transfer gate means for transferring primary disused charges to the drain shift register as transferred primary charges. The primary disused charges are accumulated in the photosenstive elements except for a specific time period in a vertical blanking time period as a part of the accumulated charges. The device further comprises drain means coupled to each drain shift register for draining the transferred primary disused charges away from each drain shift register.

According to another aspect of this invention, the device comprises a drain shift register adjacent to the second side of each column of the photosensitive elements and coupled to the horizontal shift register and drain transfer gate means for transferring primary disused charges to each drain shift register as transferred primary disused charges. The primary disused charges are accumulated in the photosensitive elements except for a specific time period in the vertical blanking time period as a part of the accumulated charges. The device further comprises drain means adjacent to the horizontal shift register for draining the transferred primary disused charges through the horizontal shift register.

According to a third aspect of this invention, the device comprises a drain shift register adjacent to each vertical shift register and drain transfer gate means for transferring disused charges accumulated in the photosensitive elements as transferred drain charges to each drain shift register through each vertical shift register. The disused charges are accumulated in the photosensitive elements except for a specific time period in the vertical blanking time period as a part of the accumulated charges. The device further comprises drain means coupled to each drain shift register for draining the transferred drain charges away from each drain shift register.

DESCRIPTION OF THE PREFERRED EMBODIMENTS

Figures 1, 2:
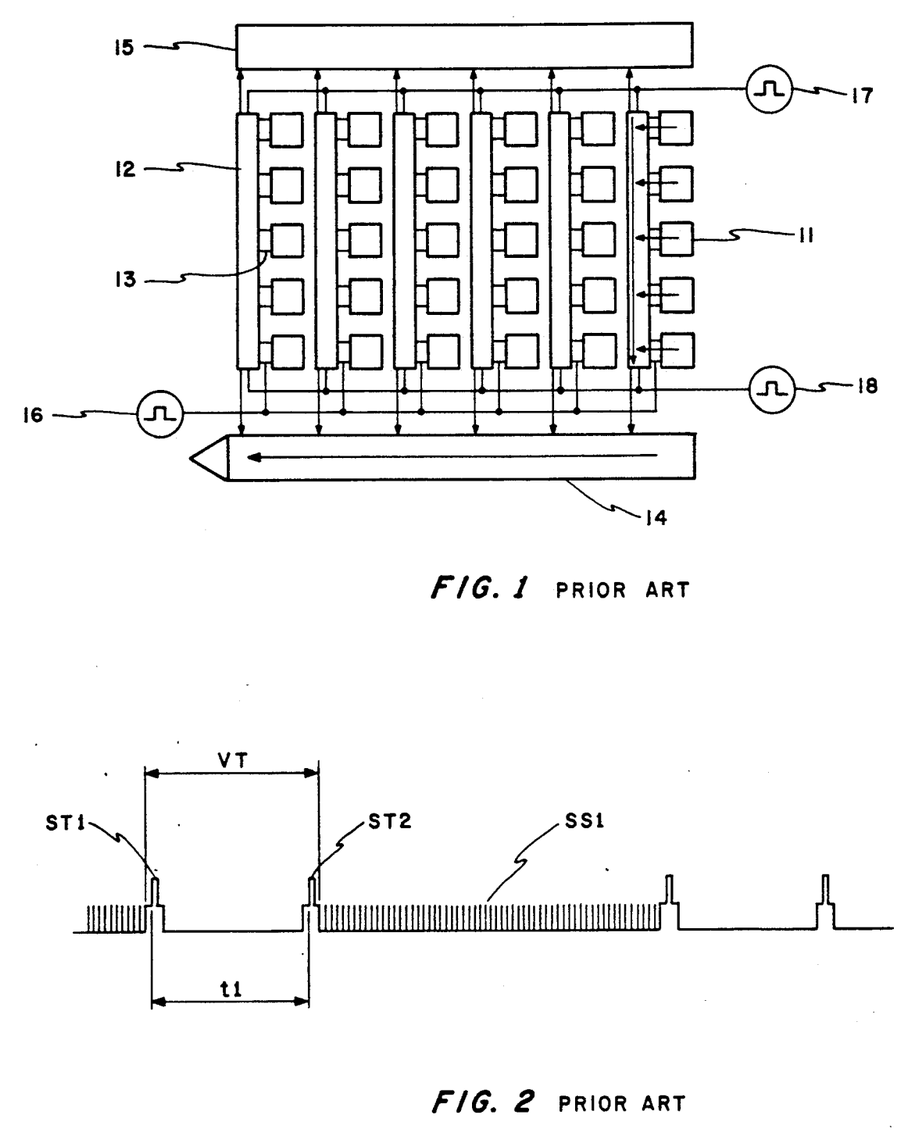
FIG. 1 is a schematic top view of a conventional solid-state image pickup device.
FIG. 2 illustrates signal waveforms for use in describing shutter operation of the solid-state image pickup device illustrated in FIG. 1.

Referring to FIG. 1, a conventional solid-state image pickup device will be described at first in order to facilitate an understanding of the present invention. The device is called a CCD solid-state image pickup device and is of the type which is for carrying out electronic shutter operation as will presently be described.

In FIG. 1, the device comprises a plurality of photosensitive elements 11, such as photodiodes, arranged in a plurality of parallel columns for accumulating electric charges as accumulated charges in response to incident light. For the time being, it will be assumed that the accumulated charges are divisible into signal charges and disused charges. The device further comprises a plurality of vertical shift registers 12, such as bidirectional shift registers, adjacent to one sides of each of the columns of the photosensitive elements 11. The bidirectional shift register is well known as a shift register which can carry out bidirectional shift operation. In order to transfer the accumulated charges to its adjacent vertical shift registers 12, a plurality of charge transfer gates 13 are formed between the photosensitive elements 11 of each column and the adjacent vertical shift register 12. A horizontal shift register 14 is coupled to one ends of each of the vertical shift registers 12. A drain circuit 15 is coupled to the other end of each of the vertical shift registers 12. One example of the drain circuit 15 is a plurality of regions held at a constant voltage each located in contact with an end of respective vertical shift register 12.

A transfer signal supplying unit 16 is connected to all of the charge transfer gates 13 to supply first and second transfer signals in each vertical blanking time period to the charge transfer gates 13. A shift pulse signal supplying unit 17 is connected to all of the vertical shift registers 12 to supply a shift pulse signal having a first clock rate to the vertical shift registers 12. Each of the vertical shift registers 12 receives the shift pulse signal through a register electrode formed by two or three polycrystalline silicon layers. A drain shift pulse signal supplying unit 18 is connected to all of the vertical shift registers 12 to supply a drain shift pulse signal having a second clock rate to the vertical shift registers 12. The second clock rate is higher than the first clock rate.

Referring afresh to FIG. 2 together with FIG. 1, description will proceed to the electronic shutter operation mentioned hereinabove.

In FIG. 2, the first and the second transfer signals are depicted at ST1 and ST2, respectively. The shift pulse signal is illustrated in the form of a sequence of pulses SS1.

The photosensitive elements 11 accumulate the electric charges as the disused charges except for a specific time period indicated at t1 in the vertical blanking time period depicted at VT. The specific time period t1 is determined by a time interval between the first and the second transfer signals ST1 and ST2. Supplied with the first transfer signal ST1, the charge transfer gates 13 transfer the disused charges to the vertical shift registers 12 as transferred disused charges. The first transfer signal ST1 may be called a drain transfer signal. On completion of supplying of the first transfer signal ST1, the drain shift pulse signal supplying unit 18 supplies the drain shift pulse signal to the vertical shift registers 12. In synchronism with the drain shift pulse signal, the vertical shift registers 12 shift the transferred disused charges to the drain circuit 15. Although pulses of the drain shift pulse signal are produced during the specific time period t1 as will presently be described, the drain shift pulse signal is not depicted in FIG. 2.

By the way, the photosensitive elements afresh accumulate the electric charges as the signal charges during the specific time period t1. The specific time period t1 will be called an electronic shutter time period. The signal charges are transferred to the vertical shift registers 12 as transferred signal charges when the transfer signal supplying unit 16 supplies the second transfer signal ST2 to the charge transfer gates 13. Under the circumstances, the vertical shift registers 12 must shift all of the transferred disused charges to the drain circuit 15 within the electronic shutter time period t1. This is the reason why the second clock rate is higher than the first clock rate. However, each of the vertical shift registers 12 can shift a restricted quantity of transferred disused charges when it is driven by the drain shift pulse signal having a high clock rate. This is because each of the vertical shift registers 12 has a delay time for shifting the transferred disused charges. The delay time is due to the high electrical resistance and the high capacitance of the register electrode. For the reason described above, the vertical shift registers 12 can not shift all of the transferred disused charges within the electronic shutter time period t1 when the photosensitive elements 11 accumulate the electric charges up to a saturated level due to the incident light having high brightness.

Figure 3:
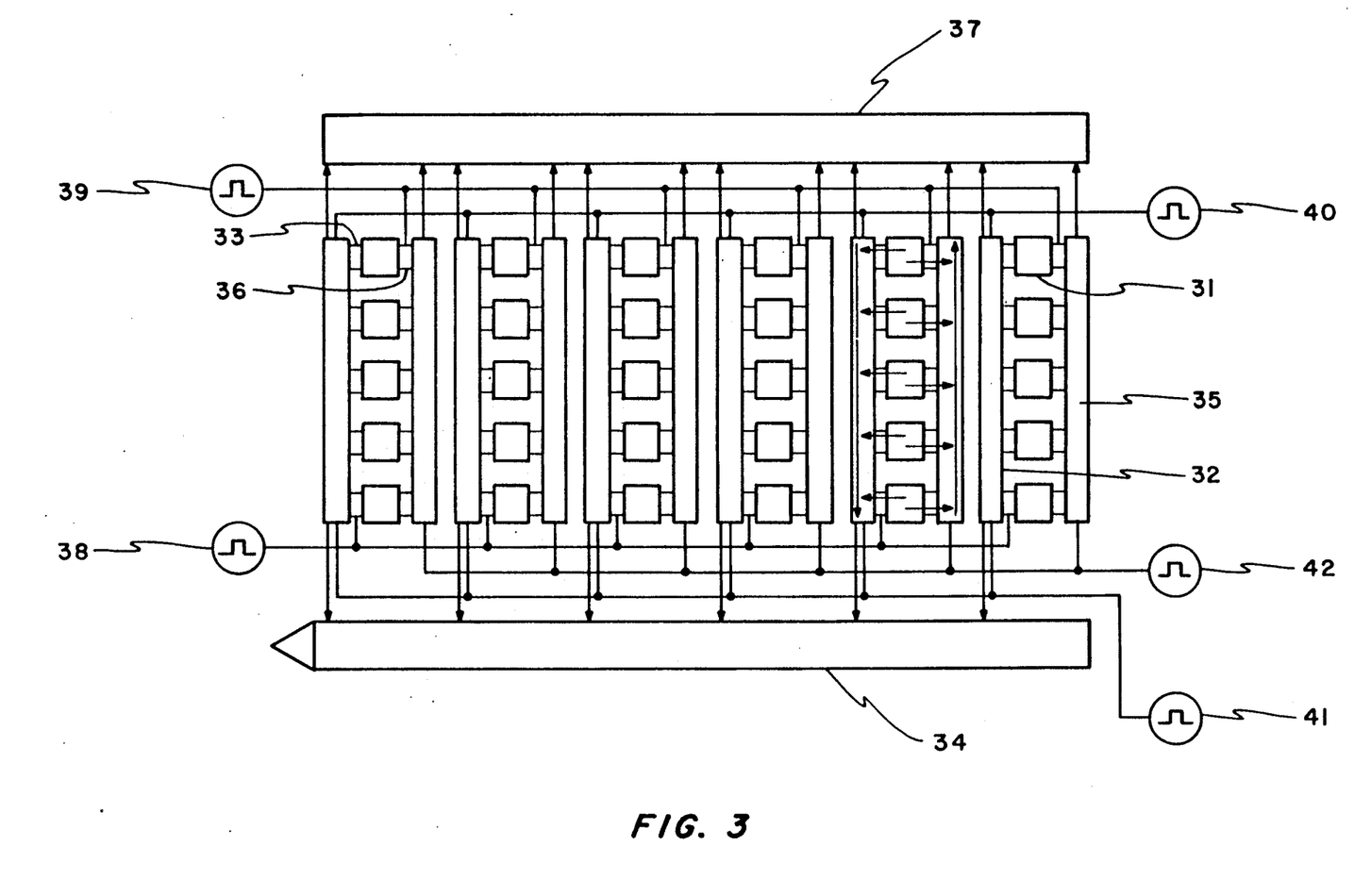
FIG. 3 is a schematic top view of a solid-state image pickup device according to a first embodiment of this invention.
Figure 4:
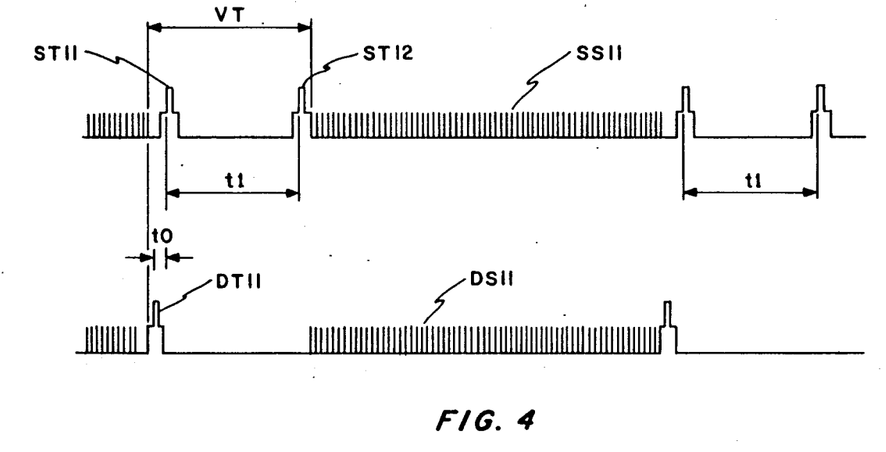
FIG. 4 illustrates signal waveforms for use in describing operation of the solid-state image pickup device illustrated in FIG. 3.

Referring to FIGS. 3 and 4, the description will proceed to a solid-state image pickup device according to a first embodiment of this invention. The device is a CCD solid-state image pickup device and is of an interline transfer type as called in the art.

The device comprises a plurality of photosensitive elements 31, such as photodiodes, in a plurality of parallel columns for accumulating electric charges as accumulated charges in response to incident light. Attention will now be directed to the accumulated charges which are divisible into signal charges, primary disused charges, and additional disused charges. In FIG. 4, the signal charges are accumulated in each vertical blanking time period VT within a specific time period t1 of the vertical blanking time period VT. The primary disused charges are accumulated except for the vertical blanking time period VT. The additional disused charges are accumulated in the vertical blanking time period VT except for the specific time period t1. An amount of the additional disused charges is smaller than that of the primary disused charges. Each of the columns of the photosensitive elements has first and second sides.

The device further comprises a plurality of vertical shift registers 32, such as bidirectional shift registers, adjacent to the first side of each column of the photosensitive elements 31. Each of the vertical shift registers 32 has first and second ends. In order to transfer the signal charges, as transferred signal charges, and the additional disused charges, as transferred additional disused charges, to the vertical shift registers 32, a plurality of transfer gates 33 are arranged between the photosensitive elements 31 of each column and its adjacent vertical shift register 32. A horizontal shift register 34 is coupled to the first end of each vertical shift register 32 for serially shifting the transferred signal charges as an image signal. In the horizontal shift register 34, a small triangle is depicted leftwardly thereof to indicate a direction with sense of the image signal.

The device further comprises a plurality of drain shift registers 35, a plurality of drain transfer gates 36, and a drain circuit 37. Each of the drain shift registers 35 is disposed adjacent to the second side of each column of the photosensitive elements 31. In order to transfer the primary disused charges as transferred primary disused charges to the drain shift registers 35, each of the drain transfer gates 36 is arranged between each of the photosensitive elements 31 and each of the drain shift registers 35. The drain circuit 37 is formed of a plurality of regions held at a constant voltage, each of which is coupled to the respective second ends of the vertical shift registers 32 and the drain shift registers 35.

A transfer signal supplying unit 38 is connected to all of the transfer gates 33 for supplying first and second transfer signals to the transfer gates 33 in each vertical blanking time period. A drain transfer signal supplying unit 39 is connected to all of the drain transfer gates 36 for supplying a drain transfer signal to the drain transfer gates 36 in each vertical blanking time period.

A shift pulse signal supplying unit 40 is connected to all of the vertical shift registers 32 for supplying a shift pulse signal to the vertical shift registers 32. The shift pulse signal is for shifting the transferred signal charges from the vertical shift registers 32 to the horizontal shift register 34 at a first clock rate. An additional shift pulse signal supplying unit 41 is connected to all of the vertical shift registers 32 for supplying an additional shift pulse signal to the vertical shift registers 32 at a second clock rate higher than the first clock rate. The additional shift pulse signal is for shifting the transferred additional disused charges from the vertical shift registers 32 to the drain circuit 37. A drain shift pulse signal supplying unit 42 is connected to all of the drain shift registers 35 for supplying a drain shift pulse signal to the drain shift registers 35 at a third clock rate. The drain shift pulse signal is for shifting the transferred primary disused charges from the drain shift registers 35 to the drain circuit 37.

In FIG. 4, an upper line depicts the first and the second transfer signals at ST11 and ST12 and pulses SS11 of the shift pulse signal. A lower line depicts the drain transfer signal at DT11 and pulses DS11 of the drain shift pulse signal. The vertical blanking time period VT is shown in common to the upper and the lower lines. Such signals are illustrated separately in two lines merely for convenience of description.

In practice, the drain transfer signal DT11 is produced from the drain transfer signal supplying unit 39 immediately following the start of the vertical blanking time period VT. The first transfer signal ST11 is produced by the transfer signal supplying unit 38 a little later than the drain transfer signal DT11 in the manner which will be described following the description of the drain shift pulse signal. The second transfer signal ST12 is produced with the time interval of the electronic shutter time period t1 described in conjunction with the conventional image pickup device. The first and the third clock rates may or may not be equal to each other. As a result, the pulses SS11 and DS11 may or may not be produced concurrently. If the pulses DS11 are produced concurrently with the pulses SS11, the shift pulse signal may be used as the drain shift pulse signal without using the drain shift pulse signal supplying unit 42. Inasmuch as pulses of the additional shift pulse signal are produced with a much shorter period than the pulses SS11 of the shift pulse signal, the additional shift pulse signal is not depicted in the upper line of FIG. 4.

Operation of the device will be described hereinunder.

At a beginning of the vertical blanking time period VT, the drain transfer signal supplying unit 39 supplies the drain transfer signal DT11 to the drain transfer gates 36. Supplied with the drain transfer signal DT11, the drain transfer gates 36 transfer the primary disused charges as the transferred primary disused charges to the drain shift registers 35. On completion of transfer of the primary disused charges, the photosensitive elements 31 afresh accumulate the electric charges as the additional disused charges. After a predetermined time interval t0 from generation of the drain transfer signal DT11, the transfer signal supplying unit 39 supplies the first transfer signal ST11 to the transfer gates 33. The transfer gates 33 transfer the additional disused charges to the vertical shift registers 32 as the transferred additional disused charges in response to the first transfer signal ST11. On completion of transfer of the additional disused charges, the photosensitive elements accumulate the electric charges as the signal charges. At the same time, the additional shift pulse signal supplying unit 41 supplies the additional shift pulse signal to the vertical shift registers 32. Responsive to the additional shift pulse signal, the vertical shift registers 32 shift the transferred additional disused charges to the drain circuit 37 at the second clock rate. An amount of the transferred additional disused charges is sufficiently smaller than that of the transferred primary disused charges. Moreover, the second clock rate is sufficiently higher than the first clock rate. Therefore, all of the transferred additional disused charges are shifted to the drain circuit 37 within the electronic shutter time period t1 regardless of the delay time of each vertical shift register 32. At an end of the electronic shutter time period t1, the transfer signal supplying unit 39 supplies the second transfer signal ST12 to the transfer gates 33. Supplied with the second transfer signal ST12, the transfer gates 33 transfer the signal charges to the vertical shift registers 32 as the transferred signal charges. On completion of transfer of the signal charges, the shift pulse signal supplying unit 40 supplies the shift pulse signal to the vertical shift registers 32. Simultaneously, the drain shift pulse signal supplying unit 42 supplies the drain shift pulse signal to the drain shift registers 35. Until a beginning of a next vertical blanking time period, the vertical shift registers 32 shift the transferred signal charges to the horizontal shift register 34 in response to the shift pulse signal while the drain shift registers 35 shift the transferred primary disused charges to the drain circuit 37 in response to the drain shift pulse signal. Thus, the transferred additional disused charges and the transferred primary disused charges are shifted perfectly to the drain circuit 37.

The accumulated charges may divide into the signal charges and the primary disused charges as described in conjunction with the conventional image pickup device. In this event, the signal charges are accumulated in the photosensitive elements 31 within the electronic shutter time period t1 while the primary disused charges are accumulated except for the electronic shutter time period t1. The first transfer signal ST11 is unnecessary. Instead, the drain transfer signal supplying unit 39 supplies the drain transfer signal DT11 to the drain transfer gates 36 at the beginning of the electronic shutter time period t1. Responsive to the drain transfer signal DT11, the drain transfer gates 36 transfer the primary disused charges to the drain shift registers 35 as the transferred primary disused charges. On completion of transfer of the primary disused charges, the photosensitive elements 31 afresh accumulate the electric charges as the signal charges. At an end of the electronic shutter time period t1, the transfer signal supplying unit 38 supplies the second transfer signal ST12 to the transfer gates 33 to transfer the signal charges to the vertical shift register 32 as the transferred signal charges. On completion of transfer of the signal charges, the vertical shift registers 32 shift the transferred signal charges to the horizontal shift register 34 in response to the shift pulse signal produced from the shift pulse signal supplying unit 40. Simultaneously, the drain shift registers 35 shift the transferred primary disused charges to the drain circuit 37 in response to the drain shift pulse signal produced from the drain shift pulse signal supplying unit 42. The specific time period may not be within the vertical blanking time period VT.

Figure 5:
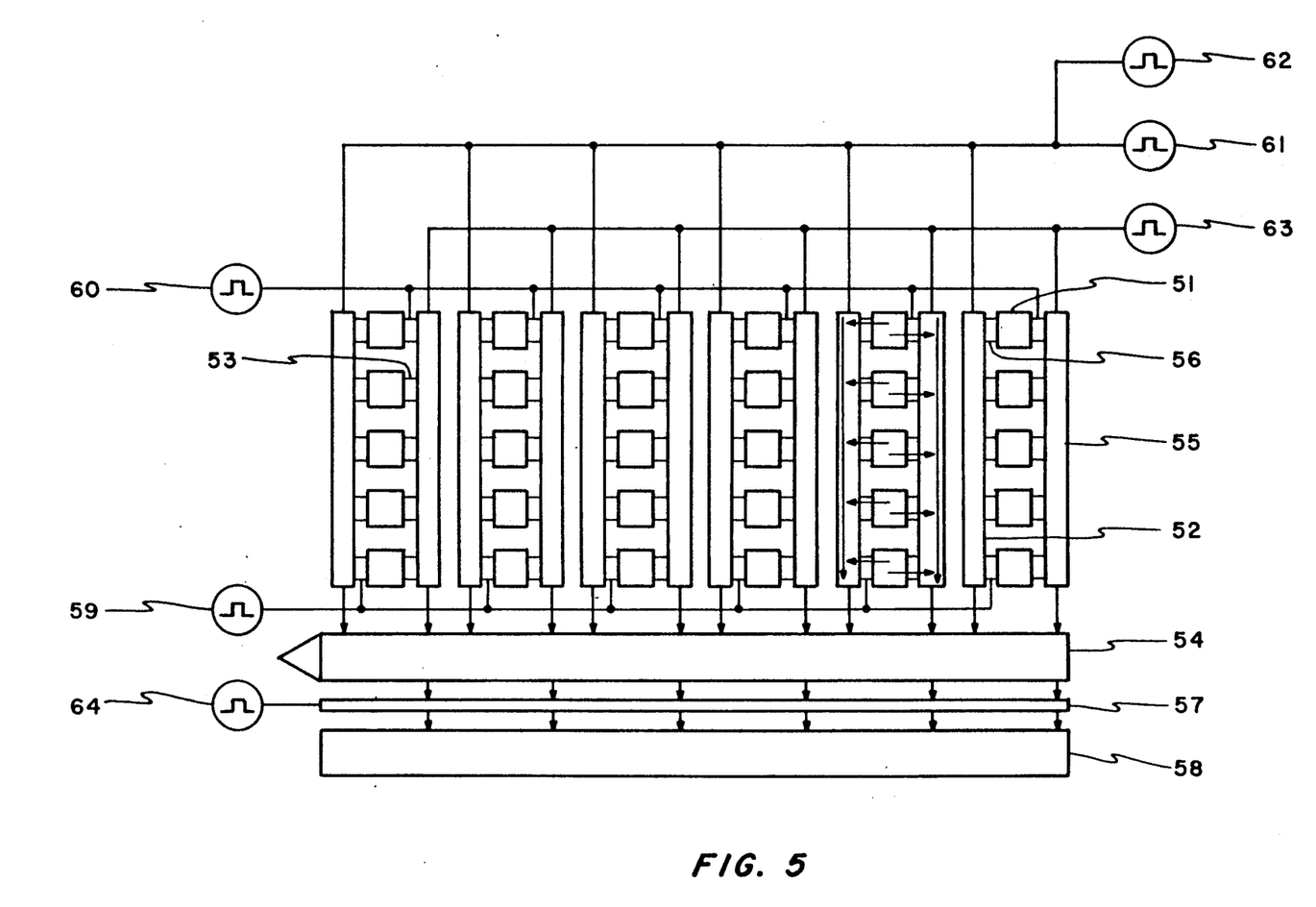
FIG. 5 is a schematic top view of a solid-state image pickup device according to a second embodiment of this invention.
Figure 6:
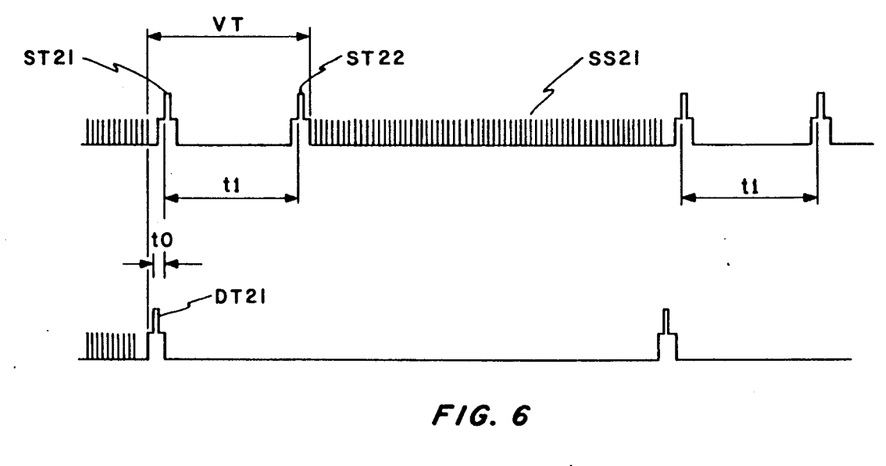
FIG. 6 illustrates signal waveforms for use in describing operation of the solid-state image pickup device illustrated in FIG. 5.

Referring to FIGS. 5 and 6, description will proceed to a solid-state image pickup device according to a second embodiment of this invention. The image pickup device is of the interline transfer type.

The device comprises a plurality of photosensitive elements 51 in a plurality of parallel columns for accumulating electric charges as accumulated charges in response to incident light. In the manner described in conjunction with FIG. 4, the accumulated charges are divisible into signal charges, primary disused charges, and additional disused charges. In FIG. 6 depicted in an upper and a lower line like FIG. 4, the signal charges are accumulated within the electronic shutter time period t1. The primary disused charges are accumulated except for the vertical blanking time period VT. The additional disused charges are accumulated in the vertical blanking time period VT except for the electronic shutter time period t1. An amount of the additional disused charges is smaller than that of the primary disused charges.

In FIG. 5, each of the columns of the photosensitive elements 51 has first and second sides. The device further comprises a plurality of vertical shift registers 52 adjacent to the first side of each column of the photosensitive elements 51. In order to transfer the signal charges, as transferred signal charges, and the additional disused charges, as transferred additional disused charges, to the vertical shift registers 52, a plurality of transfer gates 53 are arranged between the photosensitive elements 51 of each column and the adjacent vertical shift register 52. A horizontal shift register 54 is coupled to one end of each vertical shift register 52 for serially shifting the transferred signal charges as an image signal.

The device further comprises a plurality of drain shift registers 55, a plurality of drain transfer gates 56, an additional transfer gate 57, and a drain circuit 58. Each of the drain shift registers 55 is disposed adjacent to the second side of each column of the photosensitive elements 51. In order to transfer the primary disused charges as transferred primary disused charges to the drain shift registers 55, each of the drain transfer gates 56 is arranged between each of the photosensitive elements 51 and each of the drain shift registers 55. The drain circuit 58 is arranged adjacent to the horizontal shift register 54. The additional transfer gate 57 is coupled to the horizontal shift register 54 and the drain circuit 58.

A transfer signal supplying unit 59 is connected to all of the transfer gates 53 for supplying first and second transfer signals to the transfer gates 53 in each vertical blanking time period VT. A drain transfer signal supplying unit 60 is connected to all of the drain transfer gates 56 for supplying a drain transfer signal to the drain transfer gates 56 in each vertical blanking time period VT. In FIG. 6, the first and the second transfer signals are depicted at ST21 and ST22, respectively. The drain transfer signal is depicted at DT21.

A shift pulse signal supplying unit 61 is connected to all of the vertical shift registers 52 through signal supplying lines for supplying a shift pulse signal to the vertical shift registers 52. The shift pulse signal is for shifting the transferred signal charges from the vertical shift registers 52 to the horizontal shift register 54 as shifted signal charges at a first clock rate. In FIG. 6, shift pulse signal is depicted as a sequence of pulses SS21. An additional shift pulse signal supplying unit 62 is connected to all of the vertical shift registers 52 through the signal supplying lines for the shift pulse signal for supplying an additional shift pulse signal to the vertical shift registers 52. The additional shift pulse signal has a second clock rate and is for shifting the transferred additional disused charges from the vertical shift registers 52 to the horizontal shift register 54 as shifted additional disused charges as will later be described. A drain shift pulse signal supplying unit 63 is connected to all of the drain shift registers 55 for supplying a drain shift pulse signal to the drain shift registers 55. The drain shift pulse signal has a third clock rate and is for shifting the transferred primary disused charges from the drain shift registers 55 to the horizontal shift register 54 as shifted primary disused charges. Both of the second and the third clock rates are higher than the first clock rate. The second and the third clock rates may or may not be equal to each other. As a result, the additional shift pulse signal and the drain shift pulse signal may or may not be produced concurrently. If the drain shift pulse signal is produced concurrently with the additional shift pulse signal, the additional shift pulse signal may be used as the drain shift pulse signal without using the drain shift pulse signal supplying unit 63. Inasmuch as pulses of the additional shift pulse signal and the drain shift pulses signal are produced with a much shorter period than the pulses SS21 of the shift pulse signal, the additional shift pulse signal and the drain shift pulse signal are not depicted in the upper line and the lower line, respectively, of FIG. 6. An additional transfer signal supplying unit 64 is connected to the additional transfer gate 57 for supplying an additional transfer signal to the additional transfer gate 57. The additional transfer signal is for transferring the shifted primary disused charges and the shifted additional disused charges from the horizontal shift register 54 to the drain circuit 58. In the example, the vertical shift registers 52 and the drain shift registers 55 alternately shift the transferred primary disused charges and the transferred additional disused charges to the horizontal shift register 54.

Description will proceed to operation of the device. At a beginning of the vertical blanking time period VT, the drain transfer signal supplying unit 60 supplies the drain transfer signal DT21 to the drain transfer gates 56. Supplied with the drain transfer signal DT21, the drain transfer gates 56 transfer the primary disused charges as the transferred primary disused charges to the drain shift registers 55. On completion of transfer of the primary disused charges, the photosensitive elements 51 afresh accumulate the electric charges as the additional disused charges. At the same time, the drain shift pulse signal supplying unit 63 supplies the drain shift pulse signal to the drain shift register 55. Responsive to the drain shift pulse signal, the drain shift registers shift the transferred primary disused charges to the horizontal shift register 54 at the third clock rate. After a predetermined time interval t0 from generation of the drain transfer signal DT21, the transfer signal supplying unit 59 supplies the first transfer signal ST21 to the transfer gates 53. The transfer gates 53 transfer the additional disused charges to the vertical shift registers 52 as the transferred additional disused charges in response to the first transfer signal ST21. On completion of transfer of the additional disused charges, the photosensitive elements accumulate the electric charges as the signal charges. At the same time, the additional shift pulse signal supplying unit 62 supplies the additional shift pulse signal to the vertical shift registers 52. Responsive to the additional shift pulse signal, the vertical shift registers 52 shift the transferred additional disused charges to the horizontal shift register 54 at the second clock rate. During the electronic shutter time period t1, the vertical shift registers 52 and the drain shirt registers 55 alternately shift the transferred primary disused charges and the transferred additional disused charges to the horizontal shift register 54 as the shifted primary disused charges and the. shifted additional disused charges, respectively. Under the circumstances, the additional transfer signal supplying unit 64 supplies the additional transfer signal to the additional transfer gate 57 on completion of transfer of the primary disused charges. Responsive to the additional transfer signal, the additional transfer gate 57 alternately transfer the shifted primary disused charges and the shifted additional disused charges to the drain circuit 58 until a completion of the electronic shutter time period t1. Since an amount of the shifted additional disused charges is smaller than that of the shifted primary disused charges, the shifted additional disused charges are completely shifted to the drain circuit 58 within the electronic shutter time period t1.

At an end of the electronic shutter time period t1, the transfer signal supplying unit 59 supplies the second transfer signal ST22 to the transfer gates 53. Supplied with the second transfer signal ST22, the transfer gates 53 transfer the signal charges to the vertical shift registers 52 as the transferred signal charges. On completion of transfer of the signal charges, the shift pulse signal supplying unit 61 supplies the shift pulse signal to the vertical shift registers 52. Until a beginning of a next vertical blanking time period, the vertical shift registers 52 shift the transferred signal charges to the horizontal shift register 54 as shifted signal charges in response to the shift pulse signal. The horizontal shift register 54 produces the shifted signal charges as the image signal.

As described in conjunction with the first embodiment, the accumulated charges may divide into the signal charges and the primary disused charges. In this event, the signal charges are accumulated in the photosensitive elements 51 within the electronic shutter time period t1 while the primary disused charges are accumulated except for the electronic shutter time period t1. The first transfer signal ST21 is unnecessary. Instead, the drain transfer signal supplying unit 60 supplies the drain transfer signal DT21 to the drain transfer gate 56 at the beginning of the electronic shutter time period t1. Responsive to the drain transfer signal DT21, the drain transfer gates 56 transfer the primary disused charges to the drain shift registers 55. On completion of transfer of the primary disused charges, the photosensitive elements 51 afresh accumulate the electric charges as the signal charges. Simultaneously, the drain shift registers 55 start shift operation of the transferred primary disused charges to the horizontal shift register 54 in response to the drain shift pulse signal produced from the drain shift pulse signal supplying unit 63. The shift operation continues throughout the electronic shutter time period t1. At an end of the electronic shutter time period t1, the transfer signal supplying unit 59 supplies the second transfer signal ST22 to the transfer gates 53 to transfer the signal charges to the vertical shift register 52 as the transferred signal charges. On completion of transfer of the signal charges, the vertical shift registers 52 shift the transferred signal charges to the horizontal shift register 54 in response to the shift pulse signal produced from the shift pulse signal supplying unit 61. In the example described above, it is possible to omit the additional shift pulse signal supplying unit 62.

Figure 7:
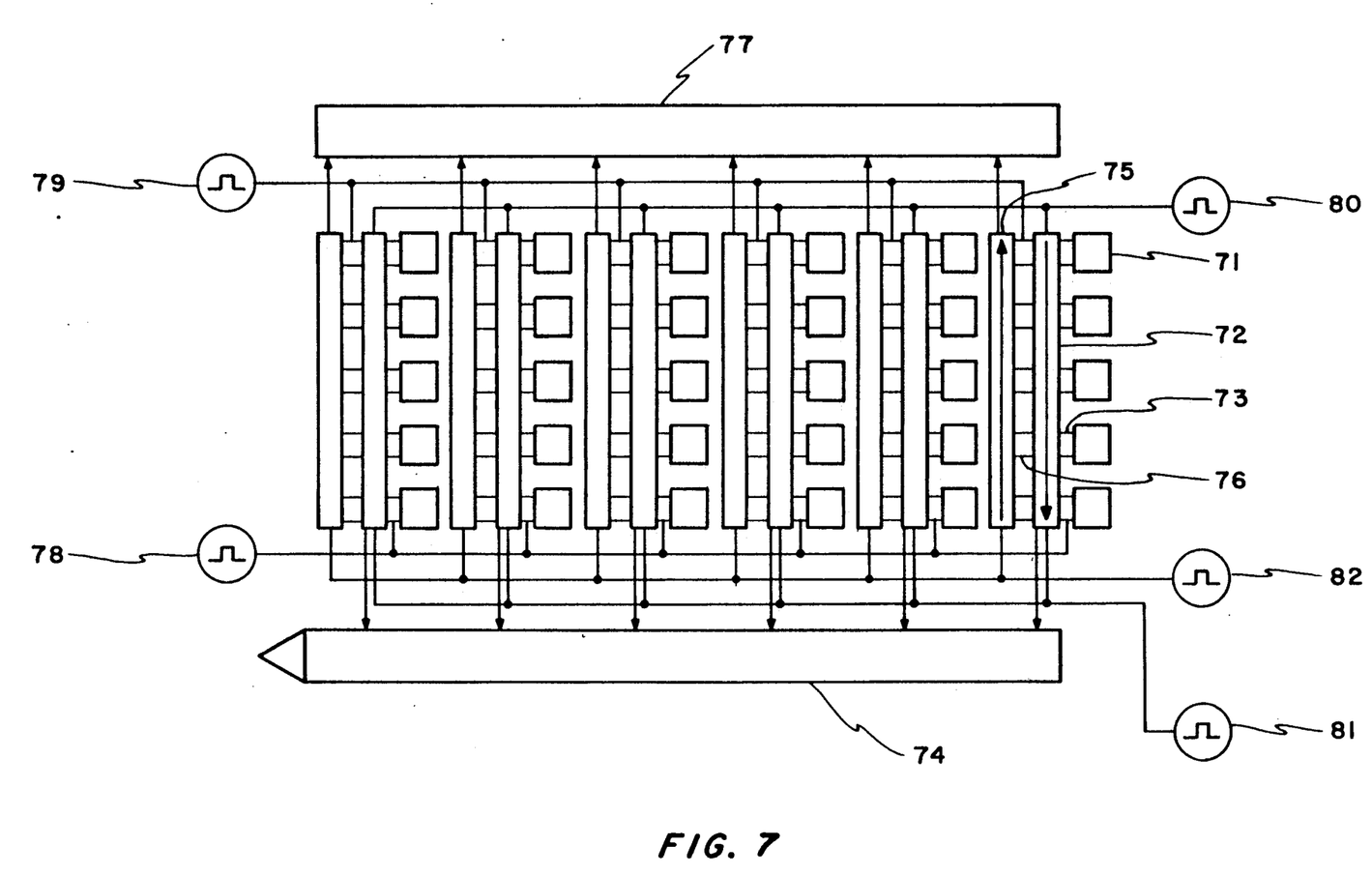
FIG. 7 is a schematic top view of a solid-state image pickup device according to a third embodiment of this invention.
Figure 8:
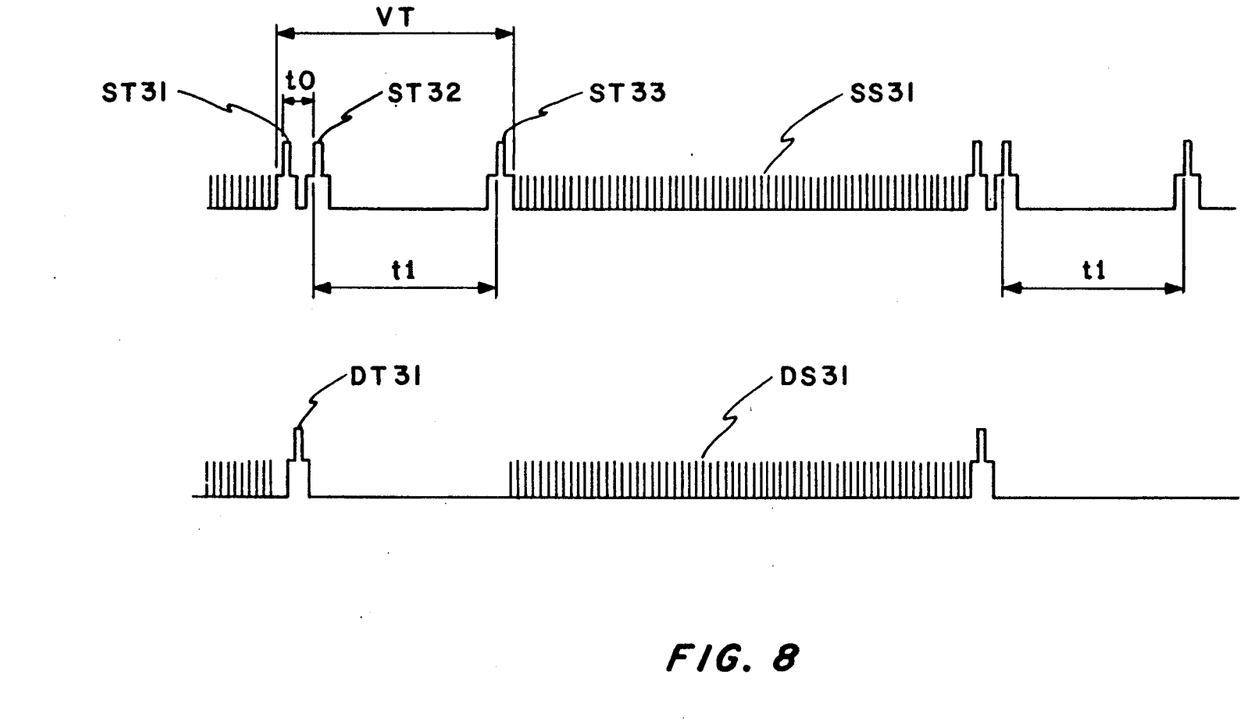
FIG. 8 illustrates signal waveforms for use in describing operation of the solid-state image pickup device illustrated in FIG. 7.

Referring to FIGS. 7 and 8, description will proceed to a solid-state image pickup device according to a third embodiment of this invention. The image pickup device is also of the interline transfer type.

The device comprises a plurality of photosensitive elements 71 in a plurality of parallel columns for accumulating electric charges as accumulated charges in response to incident light. As described in conjunction with FIG. 3, the accumulated charges are divisible into signal charges, primary disused charges, and additional disused charges. In FIG. 8 depicted in an upper and a lower line like FIG. 4, the signal charges are accumulated within the electronic shutter time period t1. The primary disused charges are accumulated except for the vertical blanking time period VT. The additional disused charges are accumulated in the vertical blanking time period VT except for the electronic shutter time period t1. An amount of the additional disused charges is smaller than that of the primary disused charges.

In FIG. 7, the device further comprises a plurality of vertical shift registers 72, such as bidirectional shift registers, adjacent to one side of each column of the photosensitive elements 71. In order to transfer the signal charges, as transferred signal charges, and the additional disused charges, as transferred additional disused charges, to the vertical shift registers 72, a plurality of transfer gates 73 are arranged between the photosensitive elements 71 of each column and the adjacent vertical shift register 72. The transfer gates 73 transfer the primary disused charges to the vertical shift registers 72 as transferred primary disused charges. A horizontal shift register 74 is coupled to one end of each vertical shift register 72 for serially shifting the transferred signal charges as an image signal.

The device further comprises a plurality of drain shift registers 75, a plurality of drain transfer gates 76, and a drain circuit 77. Each of the drain shift registers 75 is disposed adjacent to each vertical shift registers 75 is disposed adjacent to each vertical shift register 72. In order to transfer the transferred primary disused charges to the drain shift registers 75 as transferred drain charges, the drain transfer gates 76 are arranged between the vertical shift registers 72 and the drain shift registers 75. The drain circuit 77 is coupled to another end of each vertical shift register 72 and each drain shift register 75.

A transfer signal supplying unit 78 is connected to all of the transfer gates 73 for supplying first through third transfer signals to the transfer gates 73 in each vertical blanking time period VT. A drain transfer signal supplying unit 79 is connected to all of the drain transfer gates 76 for supplying a drain transfer signal to the drain transfer gates 76 in each vertical blanking time period VT. In FIG. 8, each of the first through third transfer signals is depicted by ST31, ST32, and ST33 along the upper line. A time interval between the second and the third transfer signals ST32 and ST33 is equal to the electronic shutter time period t1. The drain transfer signal is depicted at DT31 along the lower line.

A shift pulse signal supplying unit 80 is connected to all of the vertical shift registers 72 for supplying a shift pulse signal to the vertical shift registers 72. The shift pulse signal is for shifting the signal charges from the vertical shift registers 72 to the horizontal shift register 74 at a first clock rate. An additional shift pulse signal supplying unit 81 is connected to all of the vertical shift registers 72 for supplying an additional shift pulse signal to the vertical shift registers 72. The additional shift pulse signal has a second clock rate and is for shifting the transferred additional disused charges from the vertical shift registers 72 to the drain circuit 77 as will later be described. The second clock rate is higher than the first clock rate. A drain shift pulse signal supplying unit 82 is connected to all of the drain shift registers 75 for supplying a drain shift pulse signal to the drain shift registers 75. The drain shift pulse signal has a third clock rate and is for shifting the transferred drain charges from the drain shift registers 75 to the drain circuit 77.

In FIG. 8, the shift pulse signal is depicted as a sequence of pulses SS31 along the upper line while the drain shift pulse signal is depicted as a sequence of pulses DS31 along the lower line. The first and the third clock rates may or may not be equal to each other. As a result, the shift pulse signal and the drain shift pulse signal may or may not be produced concurrently. If the drain shift pulse signal is produced concurrently with the shift pulse signal, the shift pulse signal may be used as the drain shift pulse signal without using the drain shift pulse signal supplying unit 82. Inasmuch as pulses of the additional shift pulse signal are produced with a much shorter period than the pulses SS31 of the shift pulse signal, the additional shift pulse signal is not depicted in the upper line of FIG. 8.

Description will proceed to operation of the device.

At a beginning of the vertical blanking time period VT, the transfer signal supplying unit 78 supplies the first transfer signal ST31 to the transfer gates 73. Responsive to the first transfer signal ST31, the transfer gates 73 transfer the primary disused charges to the vertical shift registers 72 as the transferred primary disused charges. On completion of transfer of the primary disused charges, the drain transfer signal supplying unit 79 supplies the drain transfer signal DT31 to the drain transfer gates 76. Supplied with the drain transfer signal DT31, the drain transfer gates 76 transfer the transferred primary disused charges from the vertical shift registers 72 to the drain shift registers 75 as the transferred drain charges. On completion of transfer of the transferred primary disused charges, the photosensitive elements 71 afresh accumulate the electric charges as the additional disused charges. After a first predetermined time interval t0 from generation of the first transfer signal DT31, the transfer signal supplying unit 78 supplies the second transfer signal ST32 to the transfer gates 73. The transfer gates 73 transfer the additional disused charges to the vertical shift registers 72 as the transferred additional disused charges in response to the second transfer signal ST32. On completion of transfer of the additional disused charges, the photosensitive elements accumulate the electric charges as the signal charges. At the same time, the additional shift pulse signal supplying unit 81 supplies the additional shift pulse signal to the vertical shift registers 72. Responsive to the additional shift pulse signal, the vertical shift registers 72 shift the transferred additional disused charges to the drain circuit 77 during the electronic shutter time period t1 at the second clock rate.

At an end of the electronic shutter time period t1, the drain shift pulse signal supplying unit 82 supplies the drain shift pulse signal to the drain shift registers 75. Responsive to the drain shift pulse signal, the drain shift registers 75 shift the transferred drain charges to the drain circuit 77 until a beginning of a next vertical blanking time period. Thus, the transferred drain charges and the transferred additional disused charges are completely shifted to the drain circuit 77.

On the other hand, the transfer signal supplying unit 78 supplies the third transfer signal ST33 to the transfer gates 73 at an end of the electronic shutter time period t1. Supplied with the third transfer signal ST33, the transfer gates 73 transfer the signal charges to the vertical shift registers 72 as the transferred signal charges. On completion of transfer of the signal charges, the shift pulse signal supplying unit 80 supplies the shift pulse signal to the vertical shift registers 72. Until a beginning of a next vertical blanking time period, the vertical shift registers 72 shift the transferred signal charges to the horizontal shift register 74 as shifted signal charges in response to the shift pulse signal. The horizontal shift register 74 produces the shifted signal charges as the image signal.

In the manner described in conjunction with FIGS. 3 and 4, the accumulated charges may divide into the signal charges and the primary disused charges. In this event, the signal charges are accumulated in the photosensitive elements 71 within the electronic shutter time period t1 while the primary disused charges are accumulated except for the electronic shutter time period t1. The first and the second transfer signals ST31 and ST32 are unnecessary. Instead, the drain transfer signal supplying unit 79 supplies the drain transfer signal DT31 to the drain transfer gates 76 at the beginning of the electronic shutter time period. Responsive to the drain transfer signal DT31, the drain transfer gates 76 transfer the primary disused charges to the drain shift registers 75. On completion of transfer of the primary disused charges, the photosensitive elements afresh accumulate the electric charges as the signal charges. At the end of the electronic shutter time period t1, the transfer signal supplying unit 78 supplies the third transfer signal ST33 to the transfer gates 73 to transfer the signal charges to the vertical shift register 72 as the transferred signal charges. On completion of transfer of the signal charges, the vertical shift registers 72 shift the transferred signal charges to the horizontal shift register 74 in response to the shift pulse signal produced from the shift pulse signal supplying unit 80. Simultaneously, the drain shift registers 75 shift the transferred primary disused charges to the drain circuit 77 in response to the drain shift pulse signal produced from the drain shift pulse signal supplying unit 82. In the example described above, it is possible to omit the additional shift pulse supplying unit 81.

While this invention has thus far been described in conjunction with several preferred embodiments thereof, it will readily be possible for those skilled in the art to put this invention into practice in various other manners. For example, this invention is applicable for a frame transfer type solid-state image-pickup device or the like.

What is claimed is:

1. A solid-state image pickup device comprising a plurality of photosensitive elements arranged in a plurality of columns for accumulating electric charges in response to incident light as accumulated charges, each of said columns having first and second sides, a vertical shift register adjacent to the first side of each column of the photosensitive elements, said vertical shift register having first and second ends, transfer gate means for transferring, as transferred signal charges, said accumulated charges to said vertical shift register, and a horizontal shift register coupled to the first end of each vertical shift register for serially shifting said transferred signal charges, wherein the improvement comprises:

a drain shift register formed adjacent to the second side of each column of the photosensitive elements;

drain transfer gate means for transferring primary disused charges to said drain shift register as transferred primary disused charges, said primary disused charges being accumulated, as part of the accumulated charges, in said photosensitive elements except for a specific time period which is predetermined within a vertical blanking time period; and drain means coupled to each drain shift register for draining said transferred primary disused charges away from each drain shift register.

2. A solid-state image pickup device as claimed in claim 1, said transfer gate means comprising a plurality of transfer gates between the photosensitive elements of each of the columns and the vertical shift register adjacent to said each of the columns and transfer signal supplying means connected to said transfer gates for supplying a transfer signal to said transfer gates, said transfer signal being for transferring signal charges to each vertical shift register as the transferred signal charges, said signal charges being accumulated in said photosensitive elements within said specific time period, wherein said drain transfer gate means comprises:

a plurality of drain transfer gates between the photosensitive elements of said each of the columns and the drain shift register adjacent to said each of the columns; and drain transfer signal supplying means connected to the drain transfer gates for supplying a drain transfer signal to the drain transfer gates at a beginning of said specific time period, said drain transfer signal being for transferring the primary disused charges to each drain shift register as the transferred primary disused charges.

3. A solid-state image pickup device as claimed in claim 1, wherein each vertical shift register is of a bidirectional type, said drain means being coupled to said second end of each vertical shift register for draining additional disused charges away from the photosensitive elements through each vertical shift register, said additional disused charges being accumulated in the photosensitive elements in said vertical blanking time period except for said specific time period.

4. A solid-state image pickup device as claimed in claim 3, wherein said transfer gate means comprises:

a plurality of transfer gates between the photosensitive elements of each of the columns and the vertical shift register adjacent to said each of the columns; and transfer signal supplying means connected to the transfer gates for supplying first and second transfer signal to the transfer gates in each vertical blanking time period, said first transfer signal being for transferring said additional disused charges to each vertical shift register as transferred additional disused charges, said second transfer signal being for transferring signal charges to each vertical shift register as the transferred signal charges, said signal charges being accumulated in the photosensitive elements within said specific time period.

5. A solid-state image pickup device as claimed in claim 4, wherein said drain transfer gate means comprises:

a plurality of drain transfer gates between the photosensitive elements of said each of the columns and the drain shift register adjacent to said each of the columns; and drain transfer signal supplying means connected to the drain transfer gates for supplying a drain transfer signal to the drain transfer gates at a beginning of the vertical blanking time period, said drain transfer signal being for transferring the primary disused charges to each drain shift register as the transferred primary disused charges.

6. A solid-state image pickup device as claimed in claim 5, wherein the device further comprises:
shift pulse signal supplying means for supplying a shift pulse signal to each vertical shift register at a first clock rate on completion of transfer of the signal charges to shift the transferred signal charges from each vertical shift register to the horizontal shift register;
additional shift pulse signal supplying means for supplying an additional shift pulse signal to each vertical shift register at a second clock rate on completion of transfer of the additional disused charges to shift the transferred additional disused charges from each vertical shift register to the drain means, the second clock rate being higher than the first clock rate; and
drain shift pulse signal supplying means for supplying a drain shift pulse signal to each drain shift register to shift the transferred primary disused charges from each drain shift register to the drain means.

7. A solid-state image pickup device comprising a plurality of photosensitive elements arranged in a plurality of columns for accumulating electric charges in response to incident light as accumulated charges, each of said columns having first and second sides, a vertical shift register adjacent to the first side of each column of the photosensitive elements, transfer gate means for transferring, as transferred signal charges, said accumulated charges to the vertical shift register, and a horizontal shift register coupled to one end of each vertical shift register for serially shifting said transferred signal charges, wherein the improvement comprises:
a drain shift register adjacent to the second side of each column of the photosensitive elements and coupled to said horizontal shift register;
drain transfer means for transferring primary disused charges to each drain shift register as transferred primary disused charges, said primary disused charges being accumulated, in said photosensitive elements except for a specific time period which is predetermined within a vertical blanking time period; and
drain means adjacent to said horizontal shift register for draining said transferred primary disused charges through the horizontal shift register.

8. A solid-state image pickup device as claimed in claim 7, said transfer gate means comprising a transfer gates between the photosensitive elements of each of the columns and the vertical shift register adjacent to each of the columns and transfer signal supplying means connected to the transfer gates for supplying a transfer signal to the transfer gates, said transfer signal being for transferring signal charges to each vertical shift register as the transferred signal charges, said signal charges being accumulated in the photosensitive elements within the specific time period, wherein said drain transfer gate means comprises:
a plurality of drain transfer gates between the photosensitive elements of said each of the columns and the drain shift register adjacent to said each of the columns; and
drain transfer signal supplying means connected to the drain transfer gates for supplying a drain transfer signal to the drain transfer gates at a beginning of the specific time period, said drain transfer signal being for transferring said primary disused charges to each drain shift register as the transferred primary disused charges.

9. A solid-state image pickup device as claimed in claim 7, wherein said transfer gate means comprises:
a plurality of transfer gates between the photosensitive elements of each of the columns and the vertical shift register adjacent to said each of the columns; and
transfer signal supplying means connected to said transfer gates for supplying first and second transfer signals to the transfer gates in each vertical blanking time period, said first transfer signal being for transferring additional disused charges, as transferred additional disused charges, to each vertical shift register, said additional disused charges being accumulated in the photosensitive elements in said vertical blanking time period except for said specific time period, said second transfer signal being for transferring signal charges, as the transferred signal charges, to each vertical shift register, said signal charges being accumulated in the photosensitive elements within the specific time period.

10. A solid-state image pickup device as claimed in claim 9, wherein said drain transfer gate means comprises:
a plurality of drain transfer gates between the photosensitive elements of said each of the columns and the drain shift register adjacent to said each of the columns; and
drain transfer signal supplying means connected to the drain transfer gates for supplying a drain transfer signal to the drain transfer gates at a beginning of the vertical blanking time period, said drain transfer signal being for transferring said primary disused charges to each drain shift register as the transferred primary disused charges.

11. A solid-state image pickup device as claimed in claim 9, wherein said device further comprises:
shift pulse signal supplying means for supplying a shift pulse signal to each vertical shift register at a first clock rate on completion of transfer of the signal charges to shift the transferred signal charges from each vertical shift register to the horizontal shift register;
additional shift pulse signal supplying means for supplying an additional shift pulse signal to each vertical shift register at a second clock rate on completion of transfer of the additional disused charges to shift the transferred additional disused charges as shifted additional disused charges from each vertical shift register, the second clock rate being higher than the first clock rate; and
drain shift pulse signal supplying means for supplying a drain shift pulse signal to each drain shift register at a third clock rate to shift the transferred primary disused charges as shifted primary disused charges from each drain shift register to the horizontal shift register, the third clock rate being higher than the first clock rate.

12. A solid-state image pickup device as claimed in claim 11, wherein said drain means comprises:
a drain circuit for draining said shifted primary disused charges and said shifted additional disused charges;

an additional transfer gate between the horizontal shift register and the drain circuit for transferring said shifted primary disused charges and said shifted additional disused charges to the drain circuit; and additional transfer signal supplying means for supplying an additional transfer signal to the additional transfer gate, said additional transfer signal being for transferring said shifted primary disused charges and said shifted additional disused charges to the drain circuit.

13. A solid-state image pickup device comprising a plurality of photosensitive elements arranged in a plurality of columns for accumulating electric charges in response to incident light as accumulated charges, each of said columns having first and second sides, a vertical shift register adjacent to the first side of each column of the photosensitive elements, said vertical shift register having first and second ends, transfer gate means for transferring, as transferred signal charges, said accumulated charges to the vertical shift register, and a horizontal shift register coupled to the first end of each vertical shift register for serially shifting said transferred signal charges, wherein the improvement comprises:

a drain shift register adjacent to each vertical shift register;

drain transfer gate means for transferring primary disused charges accumulated in said photosensitive elements as transferred drain charges to each drain shift register through each vertical shift register, said primary disused charges being accumulated, as part of the accumulated charges, in said photosensitive elements except for a specific time period which is predetermined within a vertical blanking time period; and drain means coupled to each drain shift register for draining said transferred drain charges away from each drain shift register.

14. A solid-state image pickup device as claimed in claim 13, said transfer gate means comprising a plurality of transfer gates between the photosensitive elements of each of the columns and the vertical shift register adjacent to each of the columns and transfer signal supplying means connected to the transfer gates for supplying a transfer signal to the transfer gates, said transfer signal being for transferring signal charges to each vertical shift register as the transferred signal charges, said signal charges being accumulated in the photosensitive elements within the specific time period, wherein said drain transfer gate means comprises:

a plurality of drain transfer gates between each vertical shift register and the drain shift register adjacent to the vertical shift register; and drain transfer signal supplying means connected to the drain transfer gates for supplying a drain transfer signal to the drain transfer gates at a beginning of the specific time period, said drain transfer signal being for transferring said transferred primary disused charges to each drain shift register as the transferred drain charges.

15. A solid-state image pickup device as claimed in claim 13, wherein each vertical shift register is a bidirectional type, said drain means being coupled to said second end of each vertical shift register for draining additional disused charges away from the photosensitive elements through each vertical shift register, said additional disused charges being accumulated in the photosensitive elements in said vertical blanking time period except for said specific time period.

16. A solid-state image pickup device as claimed in claim 15, wherein said transfer gate means comprises:

a plurality of transfer gates between the photosensitive elements of each of the columns and the vertical shift register adjacent to said each of the columns; and transfer signal supplying means connected to the transfer gates for supplying first through third transfer signals to the transfer gates in each vertical blanking time period, said first transfer signal being for transferring said primary disused charges to each vertical shift register as transferred primary disused charges at a beginning of the vertical blanking time period, said second transfer signal being for transferring said additional disused charges to each vertical shift register as transferred additional disused charges on completion of transfer of said primary disused charges, said third transfer signal being for transferring signal charges to each vertical shift register as the transferred signal charges at an end of the specific time period, said signal charges being accumulated in the photosensitive elements within the specific time period.

17. A solid-state image pickup device as claimed in claim 16, wherein said drain transfer gate means comprises:

a plurality of drain transfer gates between each vertical shift register and the drain shift register adjacent to the vertical shift register; and drain transfer signal supplying means connected to the drain transfer gates for supplying a drain transfer signal to the drain transfer gates on completion of transfer of the primary disused charges to each vertical shift register, said drain transfer signal being for transferring said transferred primary disused charges to each drain shift register as the transferred drain charges.

18. A solid-state image pickup device as claimed in claim 17, wherein the device further comprises:

shift pulse signal supplying means for supplying a shift pulse signal to each vertical shift register at a first clock rate on completion of transfer of the signal charges to shift the transferred signal charges from each vertical shift register to the horizontal shift register;

additional shift pulse signal supplying means for supplying an additional shift pulse signal to each vertical shift register at a second clock rate on completion of transfer of the additional disused charges to shift the transferred additional disused charges from each vertical shift register to the drain means, the second clock rate being higher than the first clock rate; and drain shift pulse signal supplying means for supplying a drain shift pulse signal to each drain shift register to shift the transferred drain charges from each drain shift register to the drain means.

* * * * *